(12) United States Patent
Hanna et al.

(10) Patent No.: US 8,758,902 B2
(45) Date of Patent: Jun. 24, 2014

(54) DAMPED PRODUCT WITH AN INSERT HAVING A LAYER INCLUDING GRAPHITE THEREON AND METHODS OF MAKING AND USING THE SAME

(75) Inventors: Michael D. Hanna, West Bloomfield, MI (US); Shung H. Sung, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 568 days.

(21) Appl. No.: 12/489,901

(22) Filed: Jun. 23, 2009

(65) Prior Publication Data

US 2009/0269575 A1    Oct. 29, 2009

Related U.S. Application Data

(63) Continuation-in-part of application No. 12/272,164, filed on Nov. 17, 2008, now abandoned, and a continuation-in-part of application No. 12/174,223, filed on Jul. 16, 2008, now Pat. No. 7,950,441.

(60) Provisional application No. 60/950,906, filed on Jul. 20, 2007.

(51) Int. Cl.
*B32B 15/04* (2006.01)
*B32B 15/00* (2006.01)
*B22D 19/00* (2006.01)
*B05D 1/36* (2006.01)

(52) U.S. Cl.
USPC ............. 428/688; 428/332; 428/457; 164/75; 427/203

(58) Field of Classification Search
None
See application file for complete search history.

(56) References Cited

U.S. PATENT DOCUMENTS

| | | |
|---|---|---|
| 974,024 A | 10/1910 | Carter |
| 1,484,421 A | 2/1924 | Thomspon |
| 1,989,211 A | 1/1935 | Norton |
| 2,012,838 A | 8/1935 | Tilden |
| 2,026,878 A | 1/1936 | Farr |
| 2,288,438 A | 6/1942 | Dach |
| 2,603,316 A | 7/1952 | Pierce |
| 2,978,793 A | 4/1961 | Lamson et al. |
| 3,085,391 A | 4/1963 | Hatfield et al. |
| 3,127,959 A | 4/1964 | Wengrowski |
| 3,147,828 A | 9/1964 | Hunsaker |
| 3,292,746 A | 12/1966 | Robinette |
| 3,378,115 A | 4/1968 | Stephens, III |
| 3,425,523 A | 2/1969 | Robinette |
| 3,475,634 A | 10/1969 | Bogdanov et al. |
| 3,509,973 A | 5/1970 | Kimata |
| 3,575,270 A | 4/1971 | Wagenfuhrer et al. |
| 3,774,472 A | 11/1973 | Mitchell |
| 3,841,448 A | 10/1974 | Norton, Jr. |
| 3,975,894 A | 8/1976 | Suzuki |
| 4,049,085 A | 9/1977 | Blunier |
| 4,072,219 A | 2/1978 | Hahm et al. |
| 4,195,713 A | 4/1980 | Hagbjer et al. |
| 4,250,950 A | 2/1981 | Buxmann et al. |
| 4,278,153 A | 7/1981 | Venkatu |
| 4,338,758 A | 7/1982 | Hagbjer |
| 4,379,501 A | 4/1983 | Hagiwara et al. |
| 4,523,666 A | 6/1985 | Murray |
| 4,529,079 A | 7/1985 | Albertson |
| 5,004,078 A | 4/1991 | Oono et al. |
| 5,025,547 A | 6/1991 | Sheu et al. |
| 5,083,643 A | 1/1992 | Hummel et al. |
| 5,115,891 A | 5/1992 | Raitzer et al. |
| 5,139,117 A | 8/1992 | Melinat |
| 5,143,184 A | 9/1992 | Snyder et al. |
| 5,184,662 A | 2/1993 | Quick et al. |
| 5,259,486 A | 11/1993 | Deane |
| 5,310,025 A | 5/1994 | Anderson |
| 5,416,962 A | 5/1995 | Passarella |
| 5,417,313 A | 5/1995 | Matsuzaki et al. |
| 5,509,510 A | 4/1996 | Ihm |
| 5,539,213 A | 7/1996 | Meeks et al. |
| 5,582,231 A | 12/1996 | Siak et al. |
| 5,620,042 A | 4/1997 | Ihm |
| 5,660,251 A | 8/1997 | Nishizawa et al. |
| 5,789,066 A | 8/1998 | De Mare et al. |
| 5,819,882 A | 10/1998 | Reynolds et al. |
| 5,855,257 A | 1/1999 | Wickert et al. |
| 5,862,892 A | 1/1999 | Conley |
| 5,878,843 A | 3/1999 | Saum |
| 5,927,447 A | 7/1999 | Dickerson |
| 5,965,249 A | 10/1999 | Sutton et al. |
| 6,047,794 A | 4/2000 | Nishizawa |

(Continued)

FOREIGN PATENT DOCUMENTS

| | | |
|---|---|---|
| CH | 428319 A | 1/1967 |
| CN | 20051113784 A | 10/2005 |

(Continued)

OTHER PUBLICATIONS

PCT/US2006/029687 Search Report and Written Opinion; PCT/ISA/210 & PCT/ISA/237; Mailed Apr. 2, 2007; 6 pages.

(Continued)

*Primary Examiner* — Sheeba Ahmed

(74) *Attorney, Agent, or Firm* — BrooksGroup

(57) ABSTRACT

A product including a damping substrate and a layer over a portion thereof, the layer including graphite, and a body portion positioned so that the layer is interposed between the body portion and the damping substrate.

40 Claims, 12 Drawing Sheets

(56) References Cited

U.S. PATENT DOCUMENTS

| | | | |
|---|---|---|---|
| 6,073,735 A | 6/2000 | Botsch | |
| 6,112,865 A | 9/2000 | Wickert et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | Di Ponio | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,648,055 B1 | 11/2003 | Haug et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,293,755 B2 | 11/2007 | Miyahara et al. | |
| 7,594,568 B2 | 9/2009 | Hanna et al. | |
| 7,604,098 B2 | 10/2009 | Dessouki et al. | |
| 7,644,750 B2 | 1/2010 | Schroth et al. | |
| 7,775,332 B2 | 8/2010 | Hanna et al. | |
| 7,823,763 B2 | 11/2010 | Sachdev et al. | |
| 7,836,938 B2 | 11/2010 | Agarwal et al. | |
| 7,937,819 B2 | 5/2011 | Hanna et al. | |
| 7,938,378 B2 | 5/2011 | Hanna et al. | |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1 | 4/2006 | Dessouki et al. | |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 | 3/2007 | Hanna et al. | |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 | 12/2007 | Carter et al. | |
| 2008/0099289 A1 | 5/2008 | Hanna et al. | |
| 2008/0185249 A1 | 8/2008 | Schroth et al. | |
| 2009/0032569 A1 | 2/2009 | Sachdev et al. | |
| 2009/0107787 A1* | 4/2009 | Walker et al. | 188/381 |

FOREIGN PATENT DOCUMENTS

| | | |
|---|---|---|
| CN | 1757948 A | 4/2006 |
| CN | 2863313 Y | 1/2007 |
| DE | 2446938 A1 | 4/1976 |
| DE | 2537038 A1 | 3/1977 |
| DE | 19649919 A1 | 6/1998 |
| DE | 19948009 C1 | 3/2001 |
| DE | 60000008 T2 | 3/2002 |
| DE | 10141698 A1 | 3/2003 |
| DE | 102005048258 A1 | 4/2006 |
| DE | 60116780 T2 | 11/2006 |
| EP | 0205713 A1 | 12/1986 |
| GB | 1230274 | 4/1971 |
| GB | 2328952 A | 3/1991 |
| JP | 57154533 A | 9/1982 |
| JP | 1126434 U1 | 8/1989 |
| JP | 05-104567 | 4/1993 |
| JP | 11342461 A | 12/1999 |
| JP | 2001512763 | 8/2001 |
| JP | 2003214465 A | 7/2003 |
| JP | 2004011841 A | 1/2004 |
| KR | 10-2001-0049837 | 6/2001 |
| WO | 9823877 A1 | 6/1998 |
| WO | 0136836 A1 | 5/2001 |
| WO | 2007035206 A2 | 3/2007 |

OTHER PUBLICATIONS

Anyalebechi, P.N.; "Undulatory Solid Shell Growth of Aluminum Alloy 3003 . . . "; Materials Processing Fundamentals, TMS, 2007, pp. 31-45.

Anyalebechi, P.N.; "Ungrooved Mold Surface Topograpy Effects on Cast Subsurface Microstructure"; Materials Processing Fundamentals, TMS, 2007, pp. 49-67.

Dessouki et al. Disc Brake Squeal: Diagnosis and Prevention; Society of Automotive Engineers, 2002, 7 pages.

Hector et al., "Focused Energy Beam Work Roll Surface Texturing Science and Technology"; Journal of Material Processing & Manufacturing Science, vol. 2, Jul. 1993; pp. 63-119.

Lee et al., "Titanium Dioxide Nanotube Arrays Fabricated by Anodizing Processes"; Journal of the Electrochemical Society, 153 (11) 2006, pp. 499-505.

Sieber et al., "Porous Tantalum Oxide Prepared by Electrochemical Anodic Oxidation"; Journal of the Electrochemical Society, 152 (9) 2005, pp. 639-644.

Tanaka et al., In situ Measurement of the Diameter of Nanopores in Silicon during Anodization in Hydrofluoric Acid Solution; Journal of the Electrochemical Society; 151 (6) 2004, pp. 439-445.

Yigit et al., "Critical Wavelengths for Gap Nucleation in Solidification—Part I: Theoretical Methodology"; ASME, vol. 67, Mar. 2000, pp. 66-77.

Wu et al., "A Study of Anodization Process during Pore Formation in Nanoporous Alumina Templates"; Journal of the Electrochemical Society; 154 (1) 2007, pp. 8-12.

U.S. Appl. No. 10/961,813, filed Oct. 8, 2004; Inventor: Omar S. Dessouki.

U.S. Appl. No. 11/554,234, filed Oct. 30, 2006; Inventor: Michael D. Hanna.

U.S. Appl. No. 11/680,179, filed Feb. 28, 2007; Inventor: Jon T. Carter.

U.S. Appl. No. 11/780,679, filed Jul. 20, 2007; Inventor: Michael D. Hanna.

U.S. Appl. No. 11/848,732, filed Aug. 31, 2007; Inventor: Richard M. Kleber.

U.S. Appl. No. 11/858,596, filed Sep. 20, 2007; Inventor: Houchun Xia.

U.S. Appl. No. 11/926,798, filed Oct. 29, 2007; Inventor: Michael J. Walker.

U.S. Appl. No. 11/969,259, filed Jan. 4, 2008; Inventor: Jan H. Aase.

U.S. Appl. No. 12/025,967, filed Feb. 5, 2008; Inventor: James G. Schroth.

U.S. Appl. No. 12/105,411, filed Apr. 18, 2008; Inventor: Mark A. Golden.

U.S. Appl. No. 12/105,438, filed Apr. 18, 2008; Inventor: John C. Ulicny.

U.S. Appl. No. 12/165,729, filed Jul. 1, 2008; Inventor: Michael D. Hanna.

U.S. Appl. No. 12/165,731, filed Jul. 1, 2008; Inventor: Michael D. Hanna.

U.S. Appl. No. 12/174,163, filed Jul. 16, 2008; Inventor: Michael D. Hanna.

(56) References Cited

OTHER PUBLICATIONS

U.S. Appl. No. 12/174,223, filed Jul. 16, 2008; Inventor: Michael D. Hanna.
U.S. Appl. No. 12/174,320, filed Jul. 16, 2008; Inventor: Brent D. Lowe.
U.S. Appl. No. 12/183,104, filed Jul. 31, 2008; Inventor: Michael D. Hanna.
U.S. Appl. No. 12/183,180, filed Jul. 31, 2008; Inventor: Michael D. Hanna.
U.S. Appl. No. 12/187,872, filed Aug. 7, 2008; Inventor: Kenichi Kimura.
U.S. Appl. No. 12/272,164, filed Nov. 17, 2008; Inventor: Michael D. Hanna.
Chinese First Office Action; CN200510113784.X; Dated May 18, 2007; 19 pages.
Chinese Second Office Action; CN200510113784.X; Dated Feb. 15, 2008; 13 pages.
German Examination Report; DE102005048258.9-12; Dated Oct. 22, 2007; 8 pages.
Gerdemann, Steven J,; Titanium Process Technologies; Advanced Materials & Processes, Jul. 2001, pp. 41-43.
Mahoney, M. W. & Lynch S. P.; Friction-Stir Processing; 15 pages.
MPIF: All You Need to Know about Powder Metallurgy; http://www.mpif.org/IntroPM/intropm/asp?linkid=1; 8 pages.
Powder Metallurgy—Wikipedia article; http://en.wikipedia.org/wiki/Powder_metallurgy; 5 pages.
Sintering—Wikipedia article; http://en.wikipedia.org/wiki/Sintering; 2 pages.
Magnetorheological fluid—Wikipedia article; http:en/wikipedia.org/wiki/Magnetorheological_fluid.
PCT/US2008/087354 Written Opinion and Search Report; Date of Mailing: Aug. 3, 2009; 9 pages.
PCT/US2009/039839 Written Opinion and Search Report; Date of Mailing: Nov. 24, 2009; 7 pages.
U.S. Appl. No. 12/328,989, filed Dec. 5, 2008; First Named Inventor: Patrick J. Monsere.
U.S. Appl. No. 12/420,259, filed Apr. 8, 2009; First Named Inventor: Michael D. Hanna.
U.S. Appl. No. 12/434,057, filed May 1, 2009; First Named Inventor: Chongmin Kim.
U.S. Appl. No. 12/436,830, filed May 7, 2009; First Named Inventor: James G. Schroth.
U.S. Appl. No. 12/489,901, filed Jun. 23, 2009; First Named Inventor: Michael D. Hanna.
U.S. Appl. No. 12/885,813, filed Sep. 20, 2010; First Named Inventor: Michael D. Hanna.
Written Opinion for PCT/US2009/048424, mailed Dec. 28, 2009, 4 pages.
International Search Report for PCT/US2009/048424, mailed Dec. 28, 2009, 3 pages.

* cited by examiner

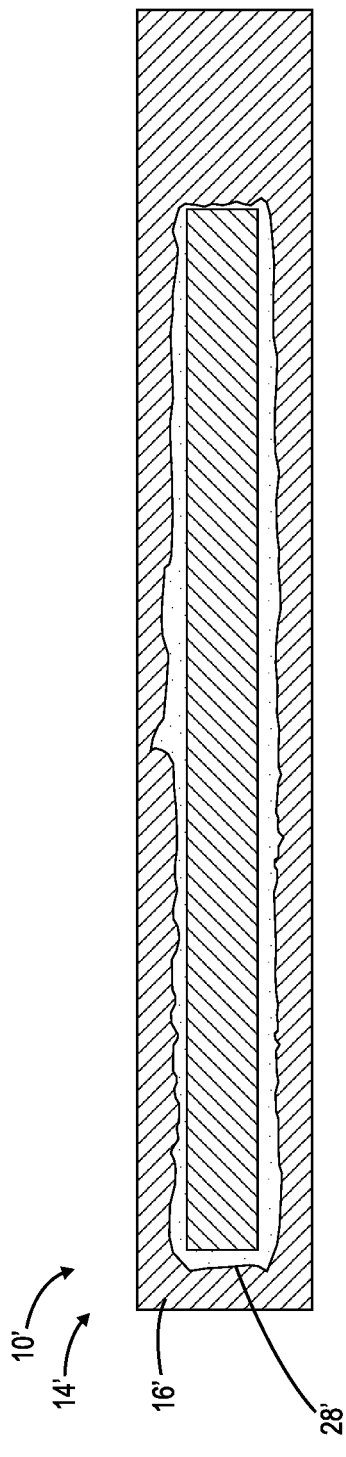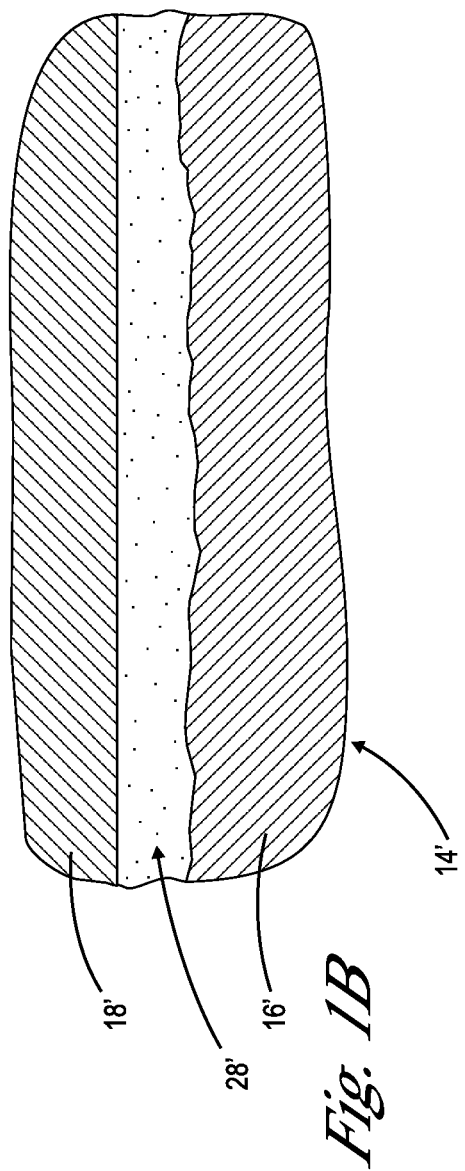
Fig. 1A
Fig. 1B

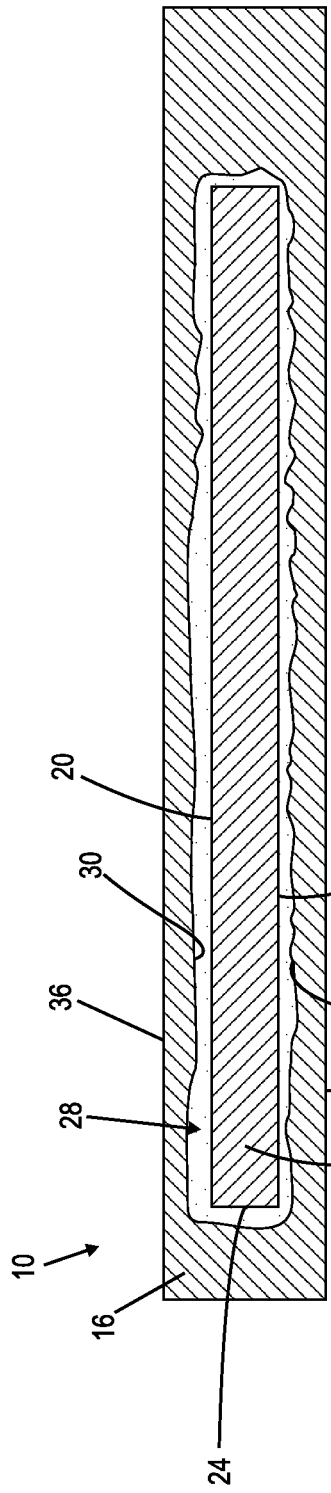
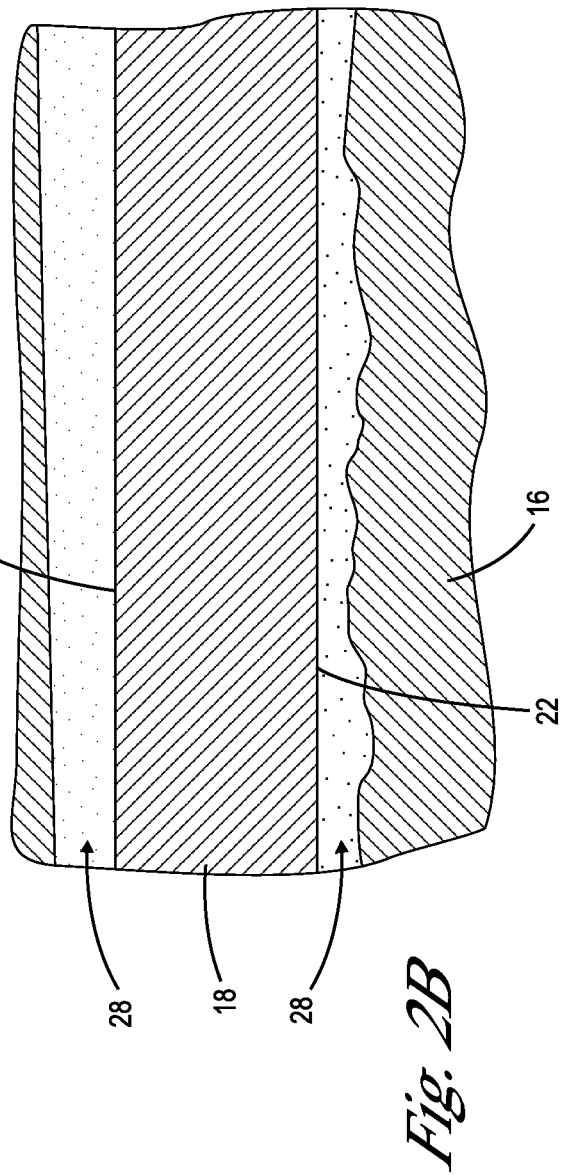
Fig. 2A
Fig. 2B

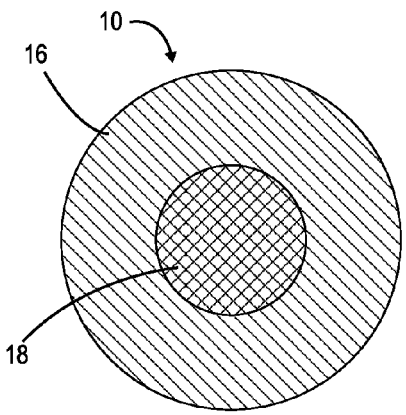
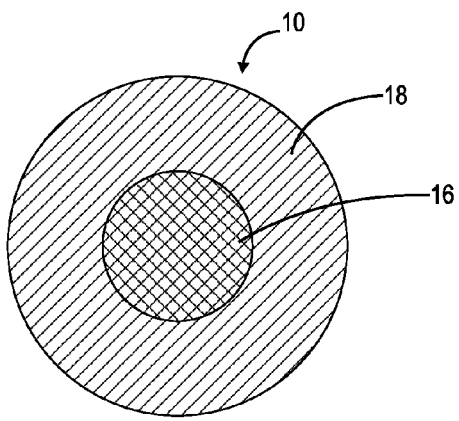
Fig. 16        Fig. 17
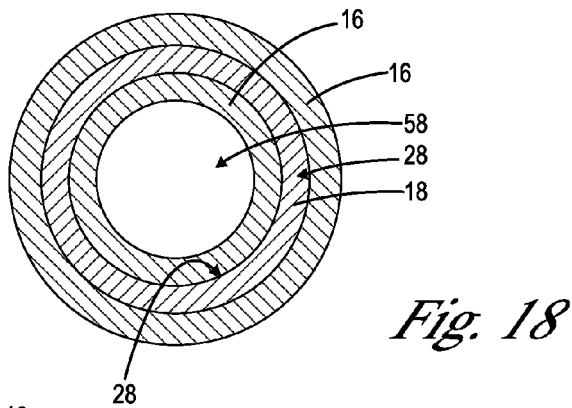
Fig. 18
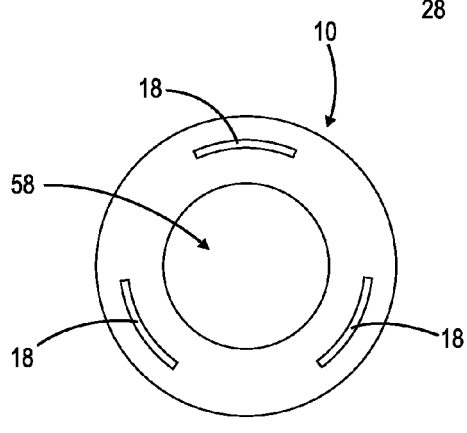
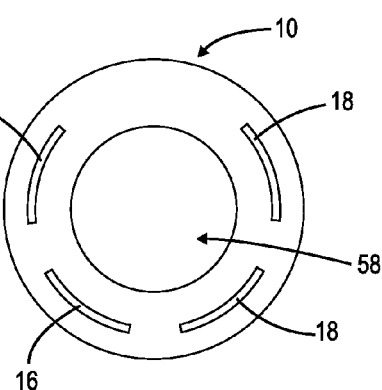
Fig. 19        Fig. 20

DAMPED PRODUCT WITH AN INSERT HAVING A LAYER INCLUDING GRAPHITE THEREON AND METHODS OF MAKING AND USING THE SAME

CROSS-REFERENCE TO RELATED APPLICATIONS

This application claims the benefit of the following priority applications: this application is a continuation-in-part of U.S. application Ser. No. 12/272,164, filed Nov. 17, 2008; and this application is a continuation-in-part of U.S. application Ser. No. 12/174,223 filed Jul. 16, 2008, which claims the benefit of U.S. Provisional Application No. 60/950, 906, filed Jul. 20, 2007.

TECHNICAL FIELD

The field to which the disclosure generally relates includes damped products including inserts and methods of making and using the same.

BACKGROUND

Products and certain components thereof may be subject to various vibrations and other oscillations when in use. Such vibrations could have undesirable effects such as, among other things, generating noise, having increasing frequency amplitude, or having a prolonged period of vibration modes.

Referring now to FIG. 1A, a prior art brake rotor 14' has been known to include a body portion 16' and an insert 18' received therein and having a layer or coating 28' thereon including ceramic or refractory materials. FIG. 1B is an enlarged view of a portion of FIG. 1A.

SUMMARY OF EXEMPLARY EMBODIMENTS OF THE INVENTION

One exemplary embodiment may include a product having a body portion, and a substrate such as, but not limited to, an insert. A layer including particles, such as graphite, is interposed between at least a portion of the substrate and the body portion, and wherein the substrate and the layer including the particles are constructed and arranged to damp vibrations of the body portion.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1A is a partial, sectional view of a portion of a vented brake rotor having a refractory coated insert embedded in a rotor cheek according to one prior art embodiment.

FIG. 1B is an enlarged view of a portion of the vented brake rotor illustrated in FIG. 1A.

FIG. 2A is a partial, sectional view of a vented brake rotor showing an insert with a layer including graphite embedded in one of the rotor cheeks according to one exemplary embodiment of the invention.

FIG. 2B is an enlarged view of a portion of a vented brake rotor illustrated in FIG. 2A.

FIG. 16 illustrates a shaft including a core insert in a layer of graphite thereon and a cast around body portion according to one exemplary embodiment of the invention.

FIG. 17 illustrates a shaft including a substrate having an inner cylindrical wall and a layer including graphite thereon, and a cast core received in the center of the substrate according to one exemplary embodiment.

FIG. 18 illustrates a bearing including a cylindrical insert and a layer including graphite thereon surrounded by inner and outer concentric body portions according to one exemplary embodiment.

FIG. 19 illustrates a bearing including three lobe inserts and a layer including graphite thereon surrounded by a body portion according to one exemplary embodiment of the invention.

FIG. 20 illustrates a bearing having five lobe inserts each having a layer including graphite thereon surrounded by a body portion according to one exemplary embodiment of the invention.

DETAILED DESCRIPTION OF EXEMPLARY EMBODIMENTS

Figure 3:
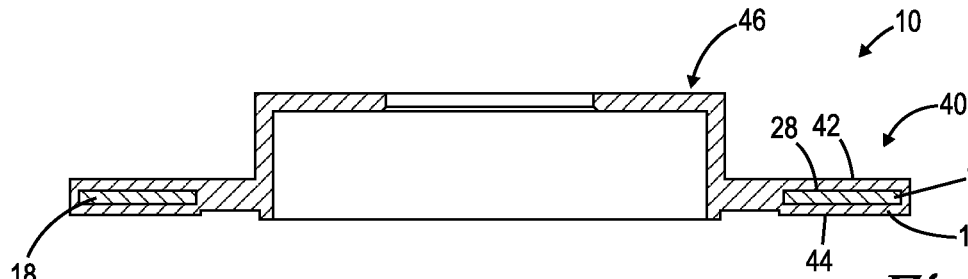
FIG. 3 is a sectional view of a brake rotor including a single rotor cheek having an insert with a layer including graphite thereon embedded in the rotor cheek according to one exemplary embodiment of the invention.

The following description of the embodiment(s) is merely exemplary (illustrative) in nature and is in no way intended to limit the invention, its application, or uses.

Referring now to FIG. 2A, one exemplary embodiment of the invention includes a product 10 which may include a body portion 16 and a damping insert 18. The damping insert 18 may include a first or upper face 20 and an opposite second or lower face 22, the damping substrate may also include a first side 24 and an opposite second side 26. A layer 28 including particles, such as but not limited to graphite, may be provided over at least a portion of at least one of the first face 20, second face 22, first side 24 or second side 26. As shown in FIG. 2A, the damping substrate 18 may be in the form of an insert and the body portion 16 of the rotor cheek or product 10 may be provided around the first face 20, second face 22, first side 24 and second side 26. However, the body portion 16 does not need to completely surround the damping substrate 18 and may be provided over, under or adjacent to least one of the first face 20, second face 22, first side 24 or second side 26. In the embodiment shown in FIG. 2A, the body portion 16 includes a first inner face 30 generally facing the first face 20 of the damping insert 18. The body portion 16 may also provide a second inner face 32 generally facing the second face 20 of the damping substrate 18. The body portion 16 may also include a first outer face 36 and an opposite second outer face 38. Although the damping substrate 18 is shown as an insert embedded in the body portion 16, the body portion 16 may be provided over, under, or adjacent one or more of the first face 20, second face 22, first side 24 or second side 26. For example, the damping insert 18 may be provided as an inlay in one of a first outer face 36 of the body portion 16 or opposite second outer face 38 of the body portion 16. In yet another embodiment, the damping insert may be provided on and/or carried by the first outer face 36 or second outer face 38 of the body portion 16. When the damping insert 18 is constructed as an inlay or a substrate overlying the first outer face 36 or second outer face 38, tangs, tabs, post or other locking features may be utilized in the body portion 16 and/or damping substrate 18 to hold the damping substrate in position, if desired. The product 10 may be constructed and arranged so that at least one of the damping insert 18, layer 28 or particles contained in the layer 28 may move relative to the body portion 18 so that vibration of the body portion may be damped by frictional movement of the layer 28 against the body portion 16 or insert 18, or the movement of particles in the layer against each other or by frictional movement of the insert 18 against the body portion 16. In other embodiments, the layer 28 is provided so that viscous energy dissipates the vibrations of the body portion 16. FIG. 2B is an enlarged view of a portion of FIG. 2A.

The particles in the layer 28 may be graphite of any of a variety of types including but not limited to, flake, fiber or powder particles in natural or synthetic form.

Referring now to FIG. 3, in one exemplary embodiment, the product 10 may be a disc brake rotor including a single rotor cheek 40 connected to a rotor hat or hub 46. A damping substrate 18 may include a layer 28 including graphite on or over at least a portion of a damping substrate 18. The damping substrate 18 with the layer 28 may be provided as an insert, inlay or may be carried by the rotor cheek 40. The rotor cheek 40 may include a first outer surface 42 and an opposite second outer surface 44 which may be engaged by brake pads to stop a vehicle. The insert 18 may take on a variety of configurations, and may include a continuous annular body portion 212. Tabs 218 may extend radially outward from an outer peripheral edge 16 or radially inward from an inner peripheral edge 14 of the annular body portion 212. The annular body portion 212 may include one or more annular ridges 220 or radially ridges 222, if desired. The layer including graphite 28 may be provided over a portion or all of the annular body portion 212. No coating or a coating that enhances the wetting of the tabs 218 may be provided on or at least a portion of the tabs 218, if desired. Alternatively, a plurality of spaced apart damping substrates 18 may be provided around the circumference of the first rotor cheek 40.

Figure 4:
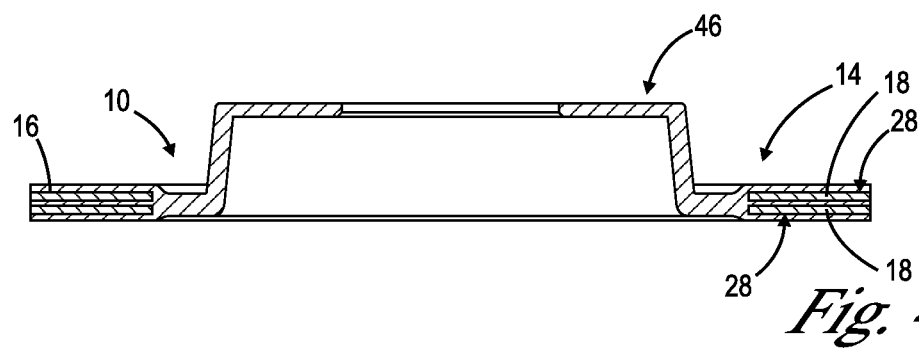
FIG. 4 is a sectional view of a brake rotor including a single rotor cheek and including two inserts each having a layer including graphite thereon embedded in the single rotor cheek according to one exemplary embodiment of the invention.

Referring now to FIG. 4, in another exemplary embodiment, first and second spaced apart damping substrates 18 may be provided in the single rotor cheek 40.

Figure 5A:
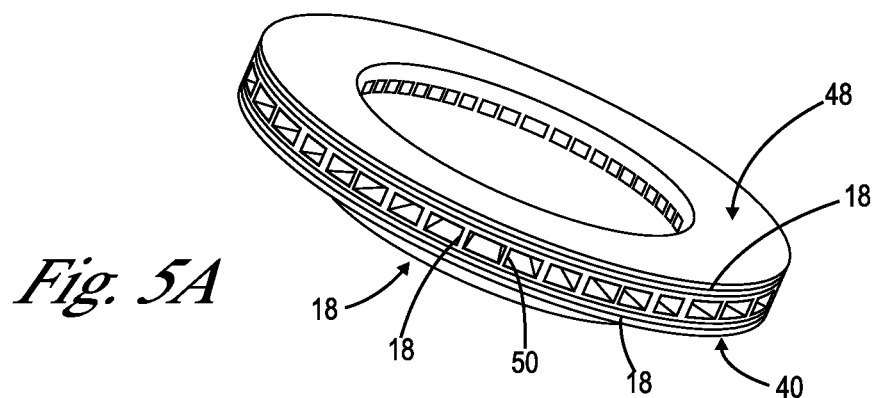
FIG. 5A is a perspective view of a vented brake rotor including a first rotor cheek (outboard) and second rotor cheek (inboard), wherein each rotor cheek includes an insert having a layer including graphite thereon according to one exemplary embodiment of the invention.
Figure 5B:
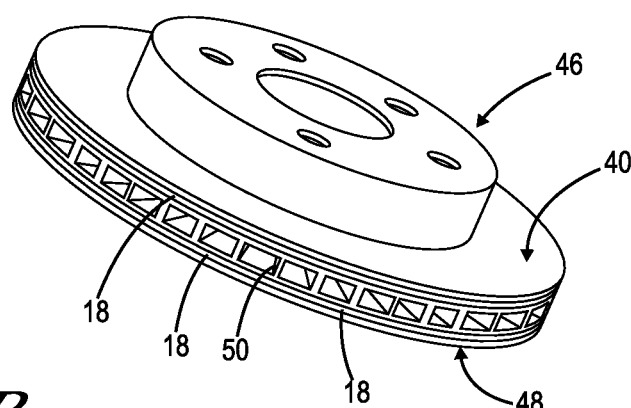
FIG. 5B is an illustration of the vented brake rotor of FIG. 5A showing the brake rotor from a perspective wherein the rotor hat or hub portion is more easily visible.
Figure 5C:
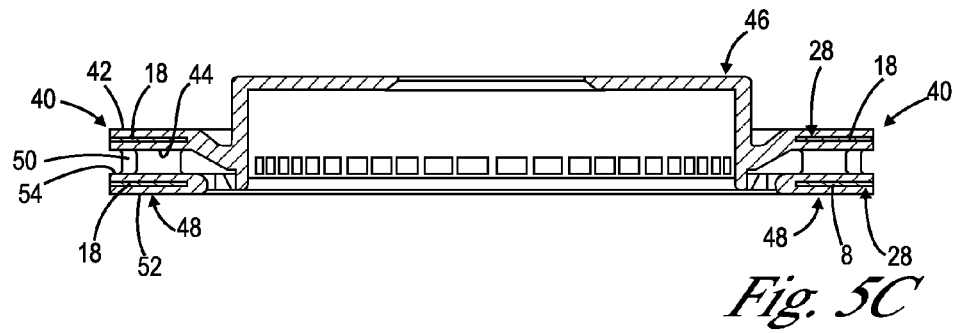
FIG. 5C is a sectional view of a vented brake rotor according to one exemplary embodiment of the invention.

Referring now to FIGS. 5A-B, in another exemplary embodiment, the product 10 may be a vented brake rotor including a first rotor cheek 40 and a second rotor cheek 48 may be provided and spaced apart by a plurality of vanes 50 extending therebetween. First and second damping substrates 18 with a layer 28 including graphite thereon may respectively be provided in the first rotor cheek 40 and second rotor cheek 48.

Figure 6A:
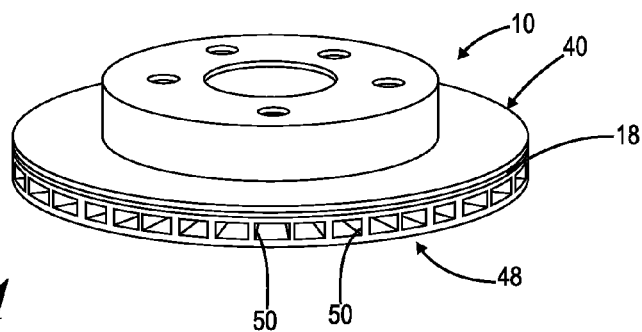
FIG. 6A is a perspective view of a vented brake rotor including an insert having a layer including graphite thereon embedded in the outboard rotor cheek according to one exemplary embodiment of the invention.
Figure 6B:
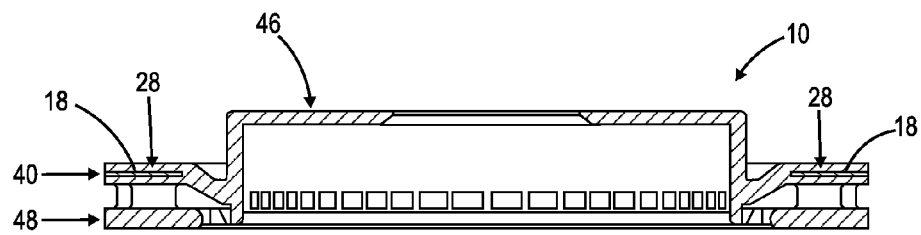
FIG. 6B is a sectional view of the vented brake rotor of FIG. 6A.
Figure 6C:
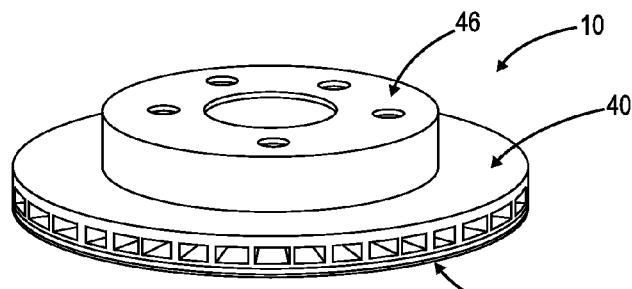
FIG. 6C is a perspective view of a vented brake rotor including an insert having a layer of graphite thereon embedded in the inboard rotor cheek.

Referring now to FIGS. 6A-C, in other exemplary embodiments, the product 10 may include a vented brake rotor including a first rotor cheek 40 and a second rotor cheek 48 in spaced apart relationship with a plurality of vanes 50 extending therebetween. A damping substrate 18 with a layer 28 including graphite may be provided in the first (outboard) rotor cheek 40 but not in the second (inboard) rotor cheek 48. Alternatively, the insert 18 including a layer 28 including graphite may be provided only in the inboard rotor cheek 48 and not in the outboard rotor cheek 40 as shown in FIG. 6C.

Figure 7:
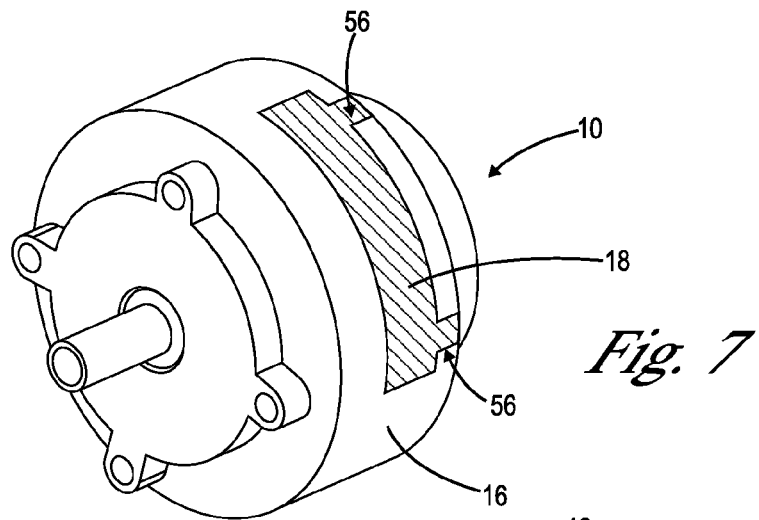
FIG. 7 illustrates a motor including a motor housing and an inlay and a layer including graphite interposed between the inlay and the housing according to one exemplary embodiment of the invention.

Referring now to FIG. 7, in another exemplary embodiment, the product 10 may be a motor including a housing having a body portion 16 and an insert 18 with a layer 28 including graphite may be provided as an inlay or an insert in the body portion 16.

Figure 8:
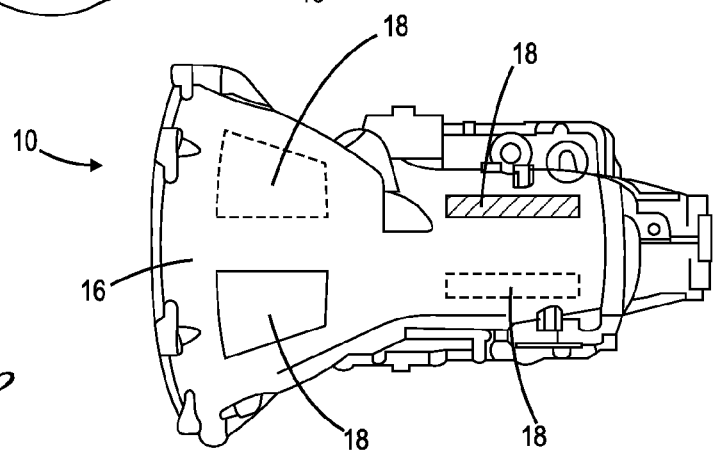
FIG. 8 illustrates a vehicle transmission including a transmission housing and an insert embedded in a wall of the housing and a layer including graphite interposed between the insert and the housing, according to one embodiment, and an inlay having a layer including graphite interposed between the housing and the inlay according to another exemplary embodiment of the invention.

Referring now to FIG. 8, in another exemplary embodiment of the invention, the product 10 may be a transmission housing including a damping insert 18 with a layer 28 including graphite over the same may be provided as an insert or inlay in a wall of the body portion 16 of the transmission housing.

Figure 9:
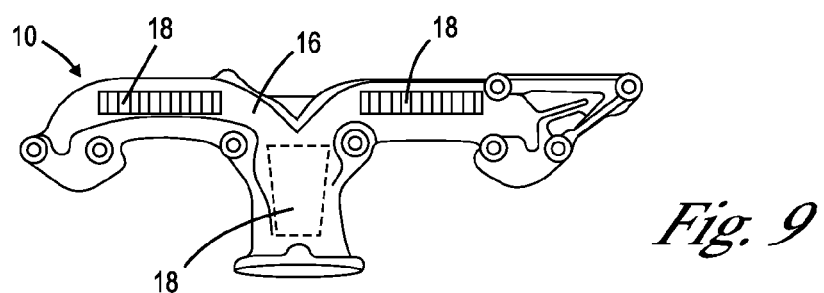
FIG. 9 illustrates a combustion engine exhaust gas manifold including an insert or inlays with a layer including graphite interposed between a wall of the manifold and the insert or inlay.

Referring now to FIG. 9, in another exemplary embodiment of the invention, the product 10 may be a combustion exhaust gas manifold including a damping substrate 18 having a layer 28 including graphite may be provided in a wall of the body portion 16 of the combustion exhaust gas manifold.

Figure 10:
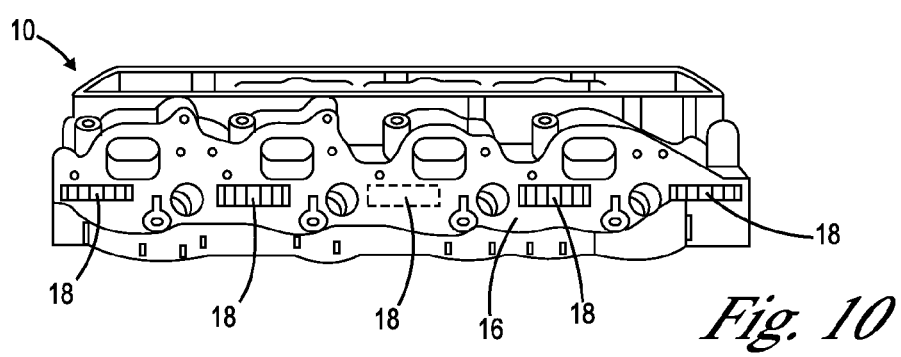
FIG. 10 illustrates a combustion engine cylinder including an insert or inlay with a layer of graphite interposed between the insert or inlay and a wall of the cylinder head.

Referring now to FIG. 10, in another exemplary embodiment of the invention, the product 10 may be a combustion engine cylinder head including a damping substrate 18 including a layer 28 including graphite may be provided as an insert or inlay in a wall of the body portion 16 of the cylinder head.

Figure 11:
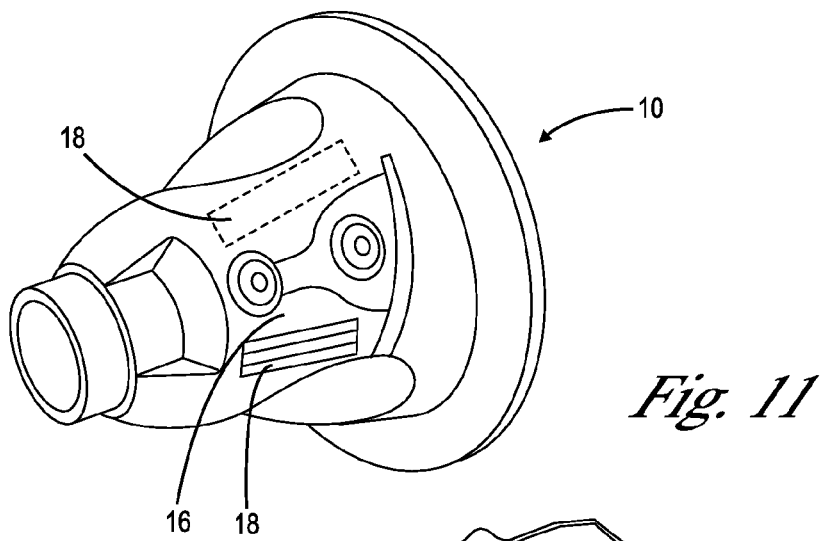
FIG. 11 illustrates a differential case including an insert or inlay and a layer of graphite interposed between a wall of the case and the insert or inlay according to one exemplary embodiment of the invention.

Referring now to FIG. 11, in another exemplary embodiment of the invention, the product 10 may be a differential case including a damping substrate 18 including a layer 28 including graphite may be provided as an insert or inlay in a wall of the body portion 16 of the differential case.

Figure 12:
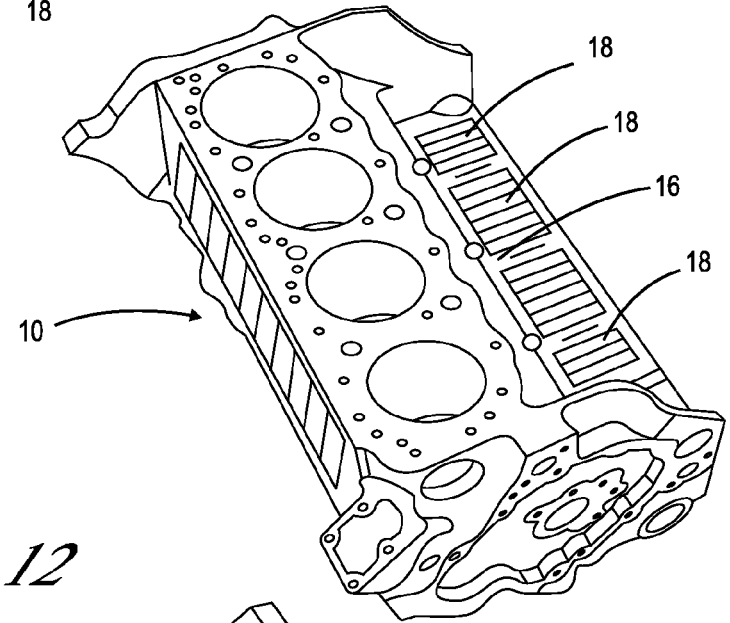
FIG. 12 illustrates an engine block including an inlay or insert and a layer of graphite interposed between the inlay or inserts and a wall of the cylinder block according to one exemplary embodiment.

Referring now to FIG. 12, in another exemplary embodiment of the invention, the product 10 may be an engine block including a damping substrate 18 including a layer 28 including graphite may be provided as an insert or inlay in a wall of the body portion 16 of the engine block.

Figure 13:
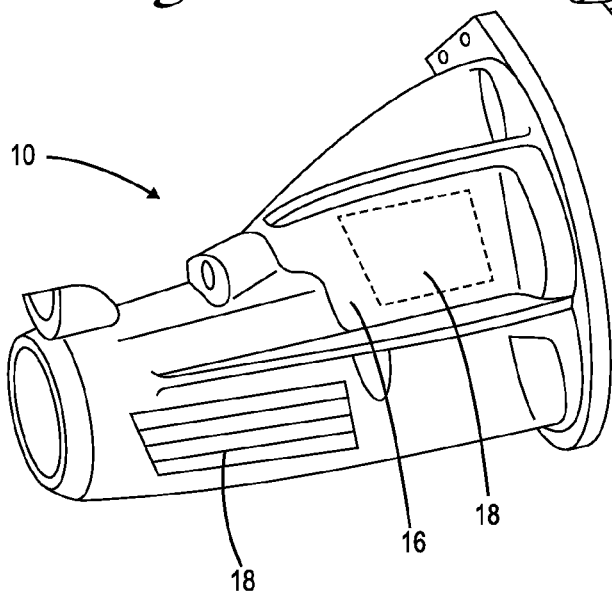
FIG. 13 illustrates a rear end housing for a rear wheel drive vehicle including an insert or inlay and a layer of graphite interposed between the insert or inlay in a wall of the housing according to one exemplary embodiment of the invention.

Referring now to FIG. 13, in another exemplary embodiment of the invention, the product 10 may be a rear end housing for a rear wheel drive vehicle including an insert 18 having a layer 28 including graphite thereon as an insert or inlay in a wall of the body portion 16 of the rear end housing.

Figure 14:
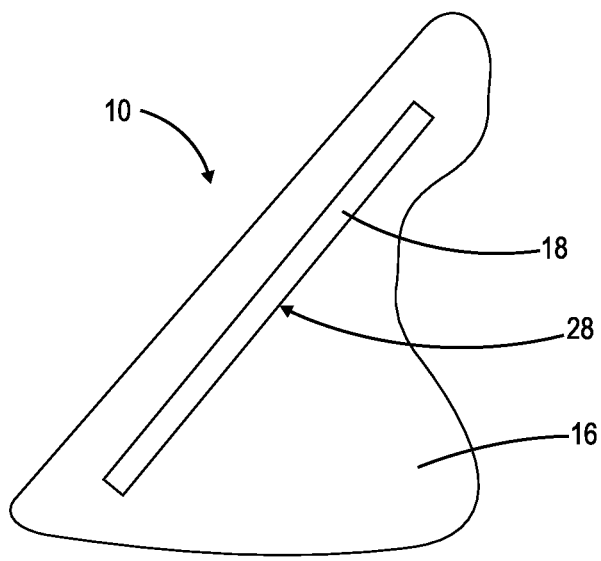
FIG. 14 is a sectional view of a golf club including a body portion and an insert, and a layer of graphite interposed between the insert and the body portion according to one exemplary embodiment of the invention.

Referring now to FIG. 14, in another exemplary embodiment of the invention, the product 10 may be a golf club iron having a head including a body portion 16 and a damping insert 18 including a layer 28 including graphite thereon as an insert or inlay in the body portion 16.

Figure 15:
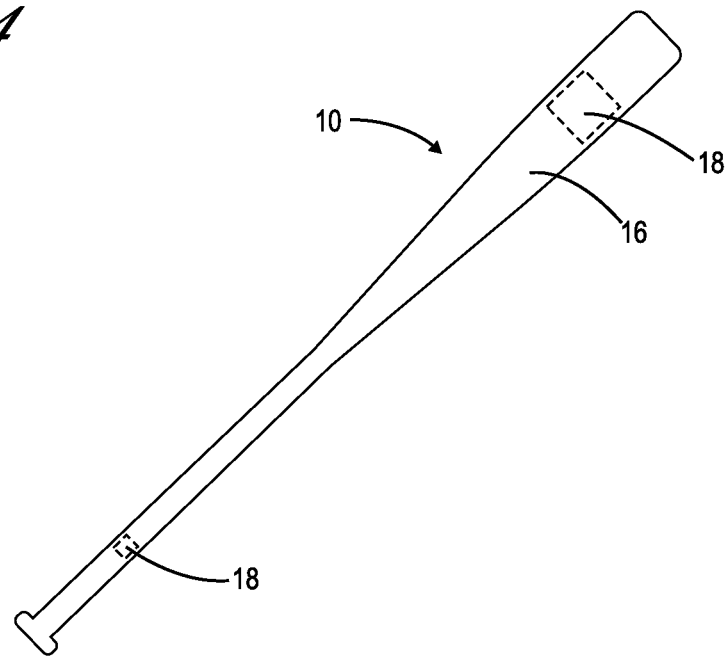
FIG. 15 illustrates a baseball bat including an insert in a wall of the baseball bat and a layer including graphite interposed between the insert and the wall of the bat according to one exemplary embodiment of the invention.

Referring now to FIG. 15, in another exemplary embodiment, the product 10 may be a baseball bat including an insert 18 having a layer 28 including graphite may be provided in a wall of the body portion 16 of the baseball bat.

Figure 27:
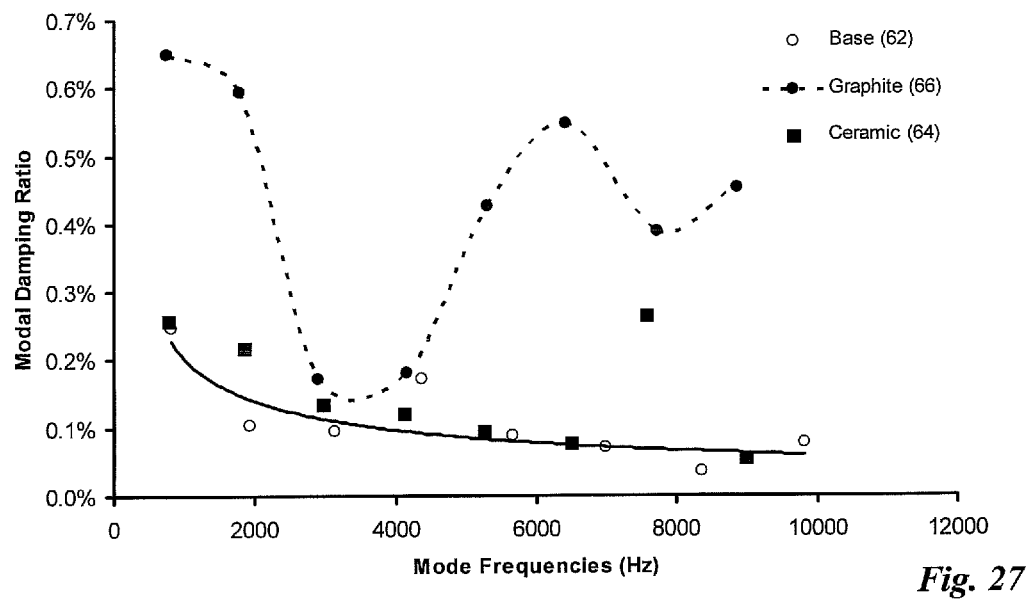
FIG. 27 is a graph illustrating the modal damping ratio for brake rotors including no insert, an insert with a ceramic coating thereon, and an insert having a layer including graphite thereon and showing that an insert including a layer including graphite has both viscous and frictional damping.
Figure 28:
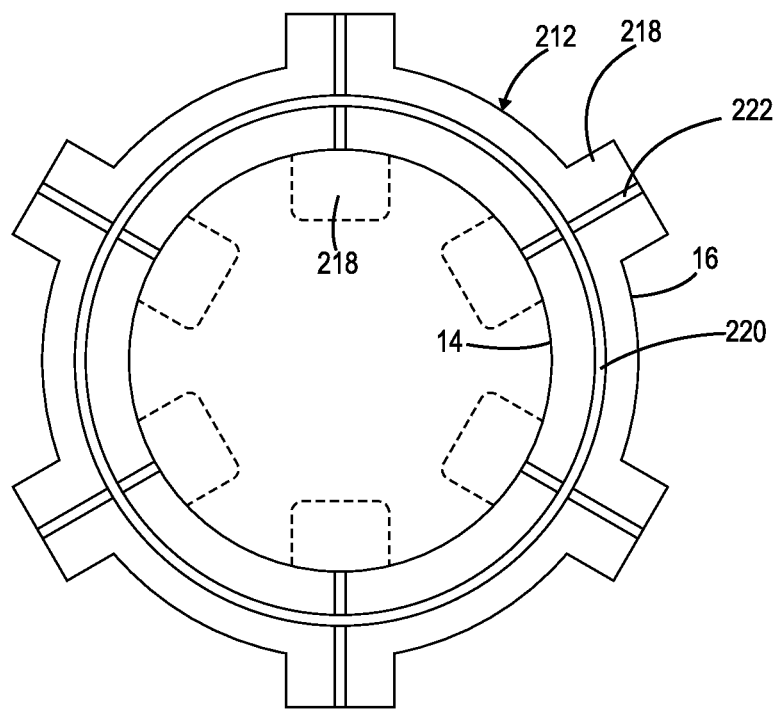
FIG. 28 illustrated a brake rotor insert having an annular body portion with a layer including graphite over at least a portion thereof and tabs extending from the annular body portion.

Referring now to FIG. 27, is a chart of the modal damping ratio versus mode frequency for brake rotors including no insert (62), a brake rotor including an insert including a ceramic coating thereon (64), and a brake rotor including an insert having a layer including graphite thereon (66).

Referring now to FIG. 17, in another exemplary embodiment of the invention, the product 10 may be a shaft having a central metal core as a body portion 16 and a damping substrate 18 having a layer 28 including graphite over an inner cylindrical surface thereof adjacent the central metal core 16.

Referring now to FIG. 18, in another exemplary embodiment of the invention, the product 10 may be a bearing including a cylindrical damping substrate 18 as an insert embedded in a cylindrical body portion 16. The bearing 10 may include a central bore 58 extending therethrough to receive a shaft therein. A shaft rotating in the bearing 10 may have a destructive residence frequency which could result in damage to the product in which the bearing 10 is located. The insert 18 with layer 28 including graphite provides a frictional damping means to dissipate undesirable vibration for oscillation of the shaft.

Referring now to FIGS. 19-20, other exemplary embodiments include bearings including three and five lobe inserts 18 having a layer 28 including graphite embedded in a cylindrical body portion 16 having a central bore 58 formed therethrough for receiving a shaft.

The insert 18 and layer 28 including graphite may be utilized in a variety of other applications including, but not limited to, hand tools, machines, manufacturing or construction equipment.

Figure 21:
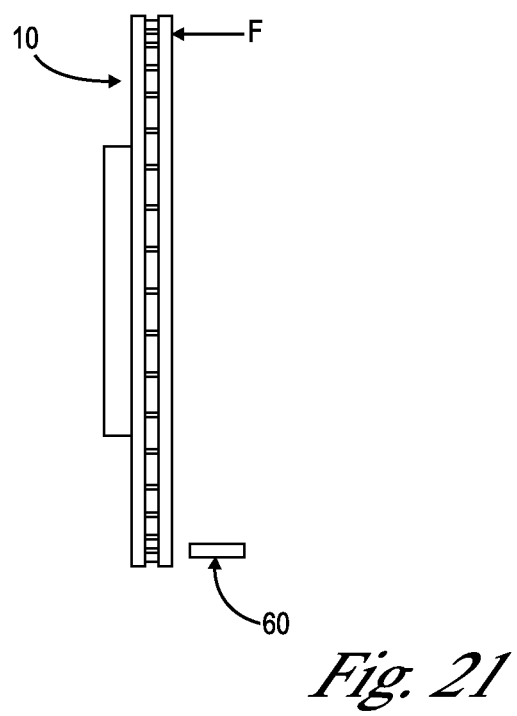
FIG. 21 illustrates a method for testing and measuring sound damping of a brake rotor.

FIG. 21 illustrates a test setup to measure damping of a brake rotor 10, which as illustrated in FIG. 21, is a vented brake rotor including an insert 18 in the outboard rotor cheek only. A microphone or other measuring device 60 is provided to pick up vibrations or sounds associated with vibration of the brake rotor 10. An impact hammer force illustrated by line F is applied to the brake rotor and the sound measured by the microphone 60. Tests were performed on brake rotors including no insert in the rotor cheek, an insert including a ceramic coating thereon, and an insert including a layer including graphite thereon.

Figure 22:
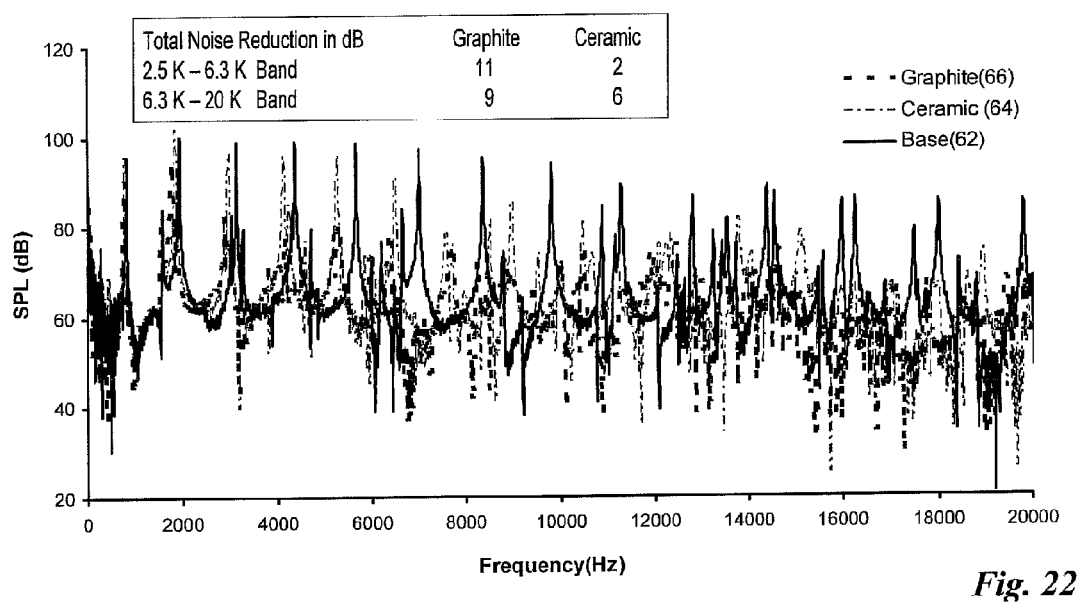
FIG. 22 illustrates sound damping results of tests conducted on three different brake rotors, wherein the first brake rotor included no insert, the second brake rotor included an insert with a ceramic coating thereon, and the third brake rotor included an insert with a layer including graphite thereon.

FIG. 22 is a graph illustrating the SPL response due to impact force on a vented brake rotor including an insert where appropriate in the inboard rotor cheek. Line 62 represents the response for a rotor with no insert, line 64 represents the response for a rotor including ceramic coating such as ladekote on the insert, and line 66 represents the response for an insert including a layer including graphite thereon.

Figure 23:
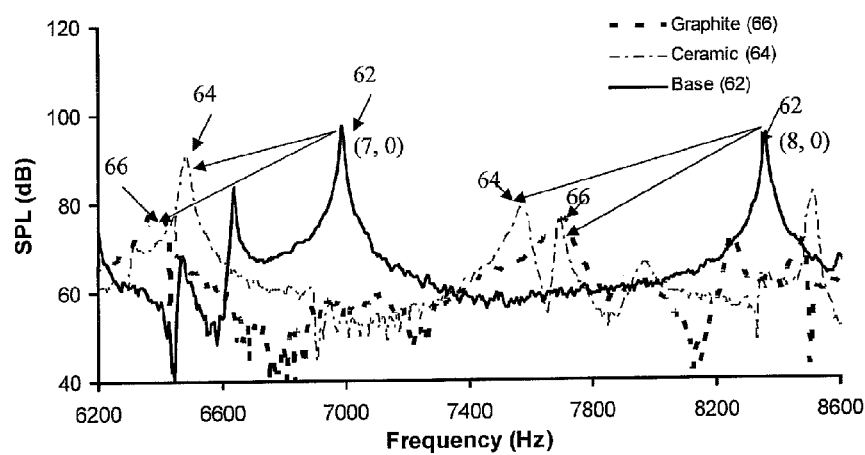
FIG. 23 is a graph illustrating the effectiveness of modal damping ratio reduction with coatings for 7,0 and 8,0 modes for brake rotors including no insert, an insert with a ceramic coating, and an insert with a layer including graphite thereon.

FIG. 23 is a graph illustrating the SPL (dB) versus frequency (Hz) for brake rotors without an insert (62), a brake rotor including an insert including a ceramic coating thereon (64) and a brake rotor including an insert having a layer including graphite thereon (66). It should be noted that for the mode (7,0) and mode (8,0), the insert with the graphite provided greater damping.

Figure 24:
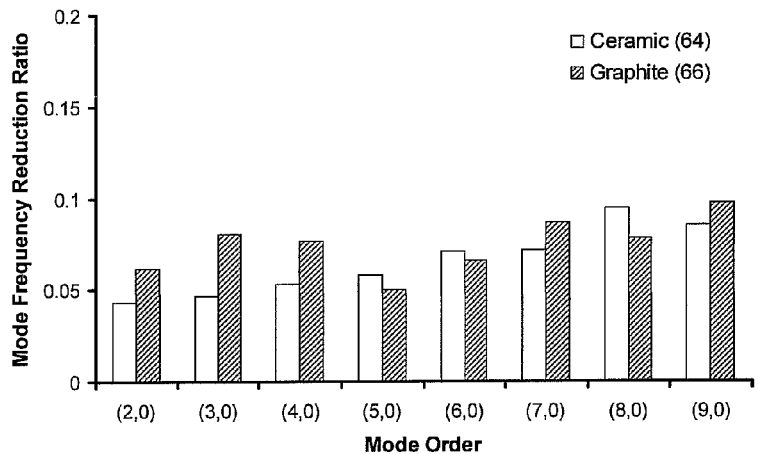
FIG. 24 is a graph illustrating the mode frequency reduction ratio for a brake rotor including an insert with a ceramic coating thereon, and a brake rotor including an insert having a layer including graphite thereon.

FIG. 24 is a graph of the mode frequency reduction ratio for brake rotors including a ceramic coating on the insert (64) and a brake rotor including a layer including graphite on the insert (66).

Figure 25:
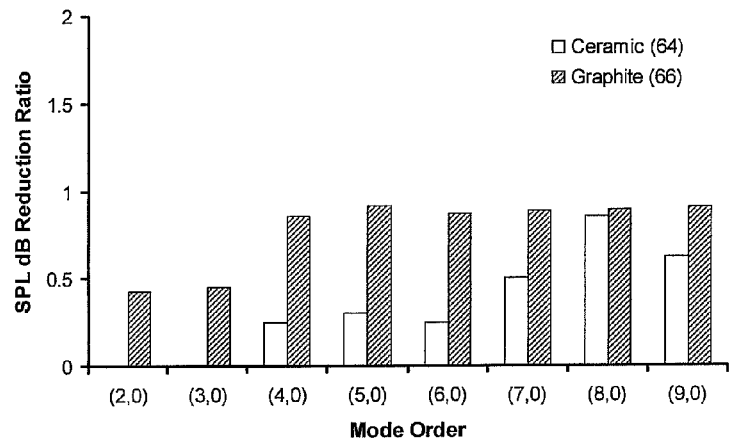
FIG. 25 illustrates the SPL dB reduction ratio for a brake rotor including an insert having a ceramic coating thereon, and a brake rotor including an insert having a layer including graphite thereon.

FIG. 25 is a graph illustrating the SPL dB reduction ratio for a rotor including a ceramic coating on an insert (64) and a rotor including a layer including graphite on the insert (66). It should be noted in FIG. 24 that graphite shows slightly more frequency reduction in the low frequency modes. It should be noted that in FIG. 25, graphite shows overall more SPL reduction for all modes except mode (8,0).

Figure 26:
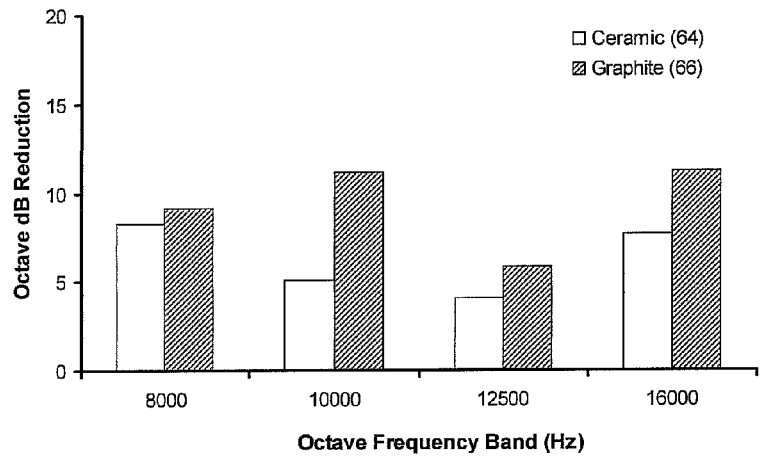
FIG. 26 is a graph illustrating the octave band response for a brake rotor including an insert having a ceramic coating thereon, and a brake rotor including an insert having a layer including graphite thereon.

FIG. 26 is a chart illustrating the summary of octave band responses for brake rotors including an insert having a ceramic coating thereon (64) and a brake rotor including an insert having a layer including graphite thereon (66). As shown in FIG. 26, graphite shows overall more octave band reduction for high frequency bands except for 8K band.

Again, FIG. 27 is a chart of the modal damping ratio versus mode frequency for brake rotors including no insert (62), a brake rotor including an insert including a ceramic coating thereon (64), and a brake rotor including an insert having a layer including graphite thereon (66). As will be appreciated from FIG. 27, the use of a layer including graphite-based material possesses both viscous and frictional damping, wherein the ceramic coated insert rotor showed little frictional damping at certain modes (8 circumferential mode).

According to one exemplary embodiment of the invention, a layer 28 may be provided on the insert 18 by a variety of methods. For example, the graphite material may be any form of graphite or graphite oxide blends with an organic or inorganic binder, mixed with clay, with water, petroleum solvent or alcohol and applied to the insert 18. In other embodiments, the graphite may be simply pressed onto the insert 18. Yet, in another embodiment, the graphite may be treated with functional groups to enhance the loose bonding of the particles to each other. The layer 28 including graphite may be deposited on the insert to a thickness sufficient so that the graphite does not cause molten metal to bond to the insert 18. In one exemplary embodiment, the layer 28 including graphite is based on the insert 18, for example, the insert 18 with a layer 28 may be baked at a temperature ranging from 50° C. to 500° C. for a period of about 5 to about 35 minutes or for at a temperature range and time sufficient to prevent molten cast metal cast around the insert 18 from removing the layer 28.

Suitable binders may include, but are not limited to, epoxy resins, phenolic acid binding agents, calcium aluminates, sodium silicates, wood flower, or clays. In other embodiments, the layer 28 may include at least one of clay, aluminum oxide, silicon dioxide, silicon carbide, silicon nitride, cordierite, magnesium-iron (aluminum silicate), mullite (aluminum silicate), zirconia (zirconium oxide) or phyllosilicate in addition to graphite. In other embodiments, the layer 28 may include a fiber such as ceramic or mineral fibers. In one exemplary embodiment, the layer 28 when applied to the insert may include a solids portion, including the graphite ranging from about 5 to about 100 weight percent and a liquid portion, including any binder, ranging from about 95 to about 0 weight percent; from about 60 to about 20 weight percent, or temperature or weight percent ranges therebetween. In another embodiment the graphite may be mixed with refractory type materials that are chemically and physically stable at high temperatures, for example including but not limited to oxides of aluminium (alumina), silicon (silica), magnesium (magnesia), calcium (lime), firclays, zirconia and/or silicaon carbide.

The exact thickness of the layer 28 may vary. Examples of suitable thicknesses may range from about 1-650, 10-400, 30-300, 30-40, 40-100, 100-20, 120-200, 200-300, 300-550, 350-450, 300-600 µm, or variations of those ranges.

The damping substrate 18 may be made from a variety of materials, including, but not limited to, steel, aluminum, ceramic, polymeric, or any other suitable material for damping. If the body portion 16 is a metal cast around the damping substrate 18, preferably the damping substrate 18 has a melting point higher than the cast material. For example, if the body portion 16 includes cast iron, the damping substrate 18 may have melting temperatures above 1100° F., above 2400° F., or above 2700° F.

Embodiments for the product 10 is made using a process wherein the damping substrate 18 and/or the graphite material is not subject to relatively high temperatures associated with molten metals, the damping substrate 18 may be made from a variety of other materials including, but not limited to, non-refractory polymeric materials, ceramics, composites, wood or other materials suitable for frictional damping.

In one illustrative embodiment, the damping substrate 18 may have a minimum average thickness of 0.2 mm and/or a minimum width of 0.1 mm and/or a minimum length of 0.1 mm. In another exemplary embodiment, the damping substrate 18 may have a minimum average thickness of 0.2 mm and/or a minimum width of 2 mm and/or a minimum length of 5 mm. In other exemplary embodiments, the damping substrate 18 may have a thickness ranging from about 0.120 mm, 0.1-6 mm or 0.1-2.5 mm or ranges therebetween.

It is believed that the use of an insert with a baked on coating of sufficient thickness as set forth above, wherein the coating including particles consisting essentially of graphite without refractory materials, and with or without a binder provides improved damping by impacting high and low frequencies vibration modes.

The above description of embodiments of the invention is merely exemplary in nature and, thus, variations thereof are not to be regarded as a departure from the spirit and scope of the invention.

What is claimed is:

1. A product comprising:
a body portion,
a damping substrate, and a layer comprising graphite interposed between a portion of the damping substrate and the body portion, the layer having a thickness sufficient so that the damping substrate and the layer including graphite friction damps vibrations of the body portion, wherein the amount of graphite present is sufficient so that the graphite does not cause molten metal to bond to the substrate when in contact with molten metal and wherein the layer does not include refractory material.

2. A product as set forth in claim 1 wherein the product comprises a brake rotor comprising the body portion.

3. A product as set forth in claim 1 wherein the product comprises a drum brake comprising the body portion.

4. A product as set forth in claim 1 wherein the product comprises an electric or fuel burning hand tool, a manufacturing machine, manufacturing equipment, or construction equipment.

5. A product as set forth in claim 1 wherein the product comprises sport equipment.

6. A product as set forth in claim 1 wherein the product comprises a vehicle component.

7. A product as set forth in claim 1 wherein the product comprises one of a motor housing, a transmission housing, an exhaust gas manifold, an engine cylinder header, a vehicle rear end housing, an engine block, a vehicle differential case, a shaft, or a bearing.

8. A product as set forth in claim 1 wherein the layer has a thickness ranging from 1-650 µm.

9. A product as set forth in claim 1 wherein the layer has a thickness ranging from 300-650 µm.

10. A product as set forth in claim 1 wherein the layer has a thickness ranging from 350-450 µm.

11. A product as set forth in claim 1 wherein the layer further comprises ceramic particles.

12. A product as set forth in claim 1 wherein the layer further comprises refractory materials.

13. A product as set forth in claim 1 wherein the layer further comprises a binder.

14. A product as set forth in claim 1 wherein the body portion comprises a cast metal.

15. A product as set forth in claim 1 wherein the body portion includes a first portion and a second portion connected together to surround the damping substrate.

16. A product as set forth in claim 1 wherein the body portion includes a first piece and a second piece welded together to enclose at least a portion of the damping substrate.

17. A method comprising:
making a damped product comprising providing a damping substrate;
forming a layer comprising graphite over at least a portion of the damping substrate, the amount of graphite being sufficient to prevent molten metal poured over the graphite from bonding to the damping substrate;
providing a body portion of the product and positioning the body portion and the damping substrate so that the layer comprising graphite is interposed between the body portion and the damping substrate, and wherein the body portion is not bonded to the damping substrate where the graphite is interposed between the body portion and the damping substrate and wherein the layer does not include refractory material.

18. A method of making a damped product comprising:
providing a damping substrate and forming a layer comprising graphite over at least a portion of the substrate, and casting molten metal over at least the portion of the damping substrate having the layer formed thereover, and so that the thickness of the graphite is sufficient to prevent the molten metal from wetting and bonding to the damping substrate at the location of the layer and so that the damping substrate and the layer or materials contained therein act to friction damp vibrations of cast metal and wherein the layer does not include refractory material.

19. A method comprising:
providing a coating comprising particles over at least a portion of an insert;
baking the coating to provide a solidified layer comprising the particles;
coating molten metal over at least a portion of the layer and solidifying the metal so that at least a portion of the layer comprising the particles remains over the insert and wherein the layer does not include refractory material.

20. A method as set forth in claim 19 wherein the particles comprises graphite in an amount sufficient to prevent molten metal from bonding to the insert when molten metal is poured on the graphite, and pouring molten metal over the insert so that graphite prevents the molten metal from bonding to the insert.

21. A method comprising:
providing a coating comprising particles over at least a portion of an insert;
baking the coating to provide a solidified layer comprising the particles;
coating molten metal over at least a portion of the layer and solidifying the metal so that at least a portion of the layer comprising the particles remains over the insert, with the proviso that the solidified layer does not include clay.

22. A method as set forth in claim 20 with the proviso that the solidified layer does not include clay.

23. A method as set forth in claim 20 with the proviso that the solidified layer does not include refractory material.

24. A product comprising:
a body portion,
a damping substrate, and a layer comprising graphite interposed between a portion of the damping substrate and the body portion, the layer having a thickness sufficient so that the damping substrate and the layer including graphite friction damps vibrations of the body portion, and wherein the amount of graphite present is sufficient so that the graphite does not cause molten metal to bond to the substrate when in contact with molten metal, with the proviso that the solidified layer does not include refractory material.

25. A product comprising:
a body portion,
a damping substrate, and a baked layer interposed between a portion of the damping substrate and the body portion, the layer having a thickness sufficient so that the damping substrate and the layer friction damps vibrations of the body portion, and wherein the thickness of the baked layer is sufficient to prevent a molten metal poured over the baked layer to bond to the substrate and wherein the baked layer does not include clay.

26. A product as set forth in claim 25 wherein the layer consists of graphite and an organic binder.

27. A product as set forth in claim 25 wherein the layer consists of graphite.

28. A product as set forth in claim 1 wherein the layer consist essentially of graphite.

29. A product as set forth in claim 17 wherein the layer consist essentially of graphite.

30. A product as set forth in claim 18 wherein the layer consist essentially of graphite.

31. A product as set forth in claim 19 wherein the particles consist essentially of graphite.

32. A product as set forth in claim 25 wherein the layer consist essentially of graphite.

33. A method as set forth in claim 17 wherein the layer has a thickness ranging from 300-650 μm.

34. A method as set forth in claim 17 wherein the layer has a thickness ranging from 350-450 μm.

35. A method as set forth in claim 18 wherein the coating has a thickness ranging from 300-650 μm.

36. A product as set forth in claim 18 wherein the coating has a thickness ranging from 350-450 μm.

37. A product comprising:
a body portion,
a damping substrate, and a layer comprising graphite interposed between a portion of the damping substrate and the body portion, the layer having a thickness sufficient so that the damping substrate and the layer including graphite friction damps vibrations of the body portion, and wherein the amount of graphite present is sufficient so that the graphite does not cause molten metal to bond to the substrate when in contact with molten metal, with the proviso that the layer does not include clay.

38. A method comprising:
making a damped product comprising providing a damping substrate;
forming a layer comprising graphite over at least a portion of the damping substrate, the amount of graphite being sufficient to prevent molten metal poured over the graphite from bonding to the damping substrate; providing a body portion of the product and positioning the body portion and the damping substrate so that the layer comprising graphite is interposed between the body portion and the damping substrate, and wherein the body portion is not bonded to the damping substrate where the graphite is interposed between the body portion and the damping substrate, with the proviso that the layer does not include clay.

39. A product comprising:

a body portion, a damping substrate, and a coating comprising particles consisting essentially of graphite interposed between a portion of the damping substrate and the body portion, the layer having a thickness sufficient so that the damping substrate and the layer including graphite friction damps vibrations of the body portion, wherein the amount of graphite present is sufficient so that the graphite does not cause molten metal to bond to the substrate when in contact with molten metal and wherein the particles do not include refractory material.

40. A method comprising:

providing a coating comprising particles consisting essentially of graphite over at least a portion of an insert;

baking the coating to provide a solidified layer comprising the particles;

coating molten metal over at least a portion of the layer and solidifying the metal so that at least a portion of the layer comprising the particles remains over the insert and wherein the particles do not include refractory material.

\* \* \* \* \*